May 23, 1950     H. KNOWLER ET AL     2,508,883
FLYING CONTROL FOR AIRCRAFT
Filed Dec. 10, 1947     3 Sheets-Sheet 1
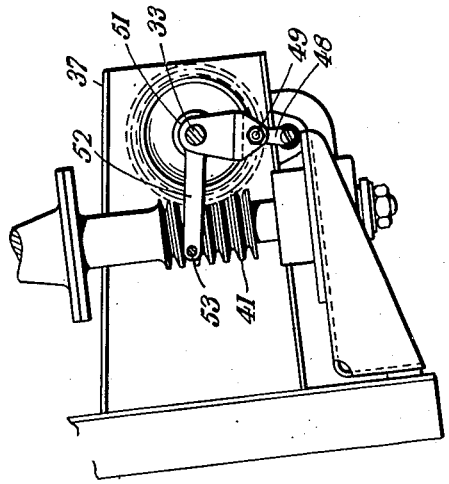
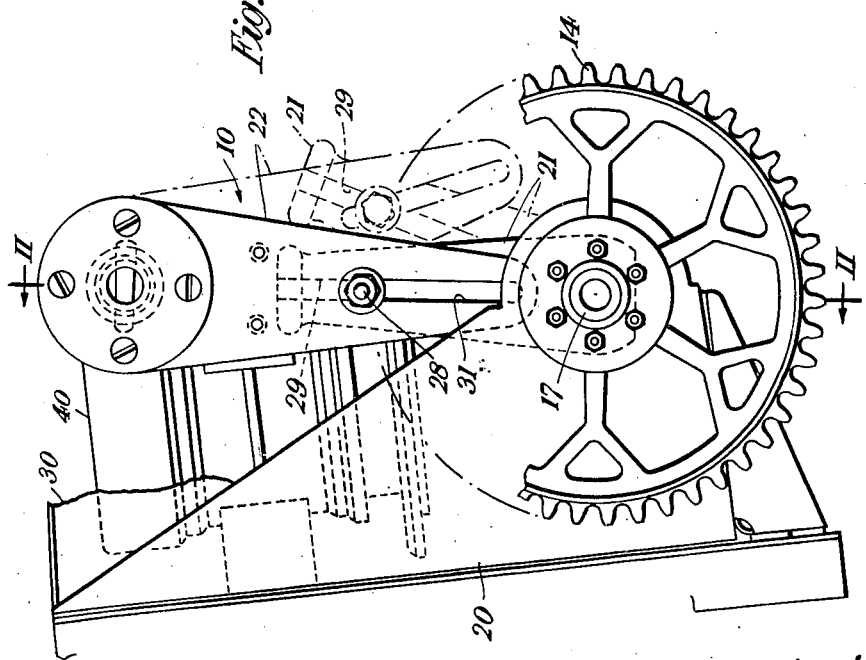

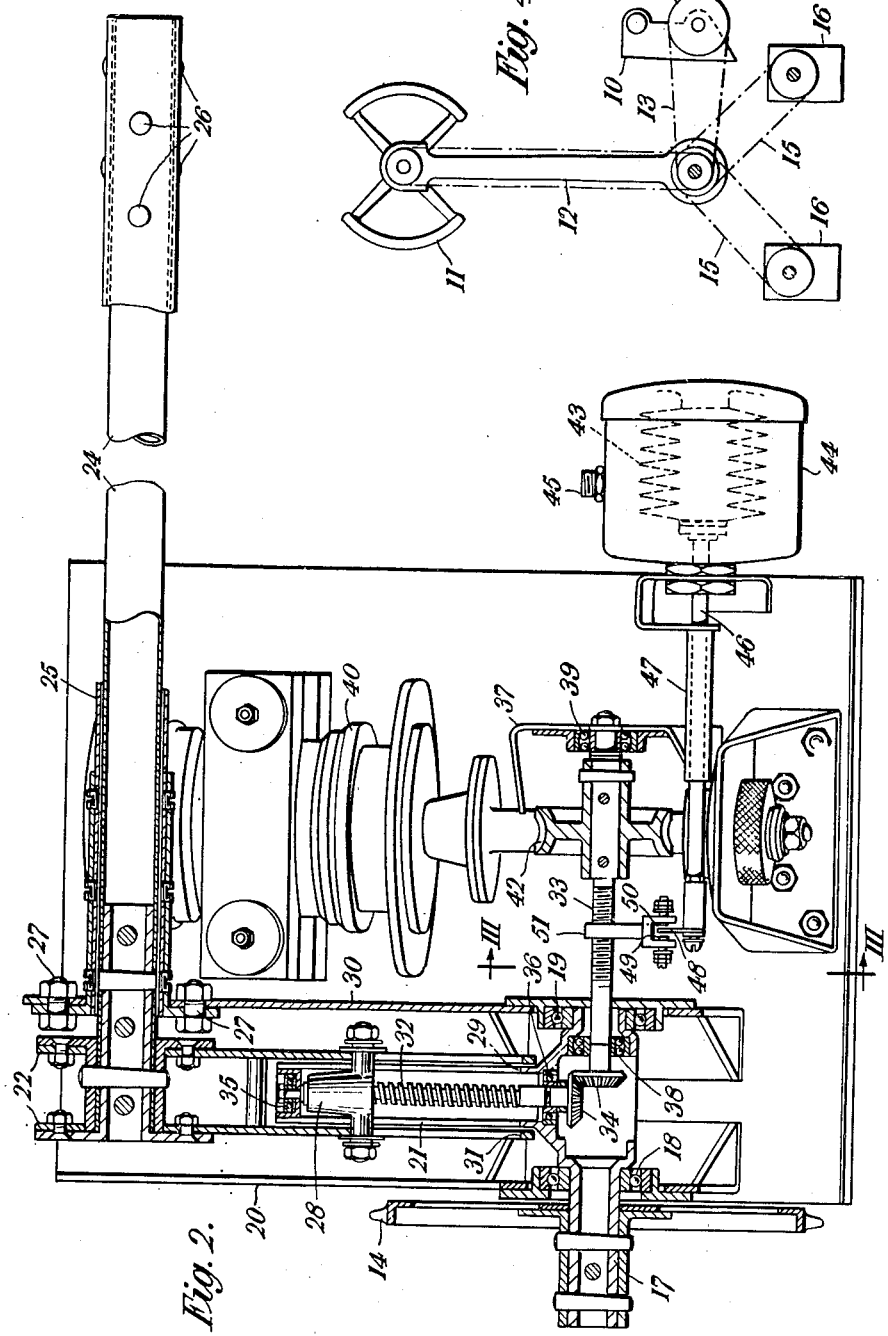

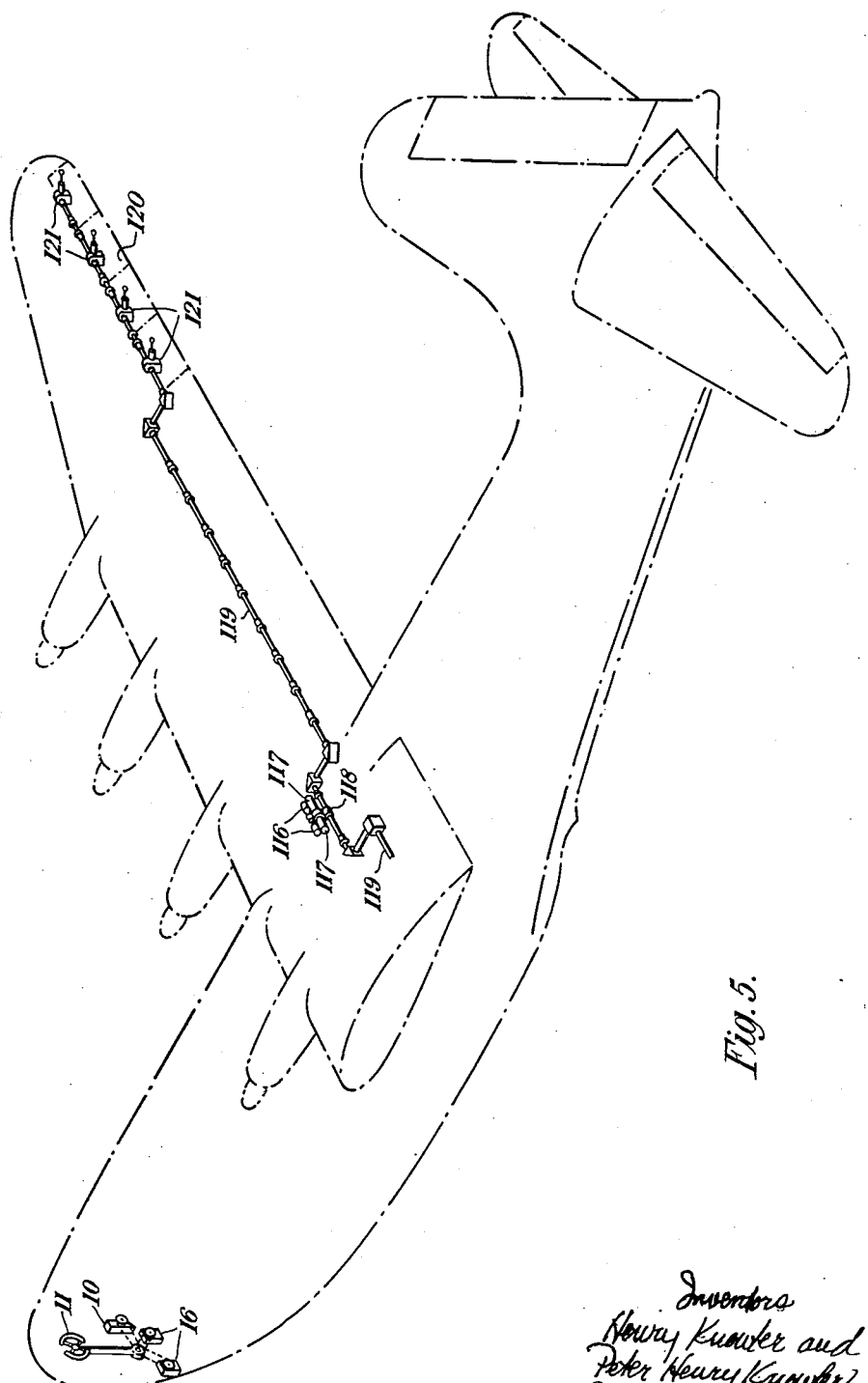

Patented May 23, 1950

2,508,883

UNITED STATES PATENT OFFICE 2,508,883

FLYING CONTROL FOR AIRCRAFT

Henry Knowler and Peter Henry Knowler, Ryde, Isle-of-Wight, England, assignors to Saunders-Roe Limited, Osborne, East Cowes, Isle-of-Wight, England Application December 10, 1947, Serial No. 790,774
In Great Britain October 16, 1946

Section 1, Public Law 690, August 8, 1946
Patent expires October 16, 1966

7 Claims. (Cl. 244—78)

In an aircraft fitted with fully power-operated flying controls, there would normally be no resistance to movement of the pilot's control member. This is undesirable, and the object of this invention is to provide a feel generator whereby "feel" may be artificially applied to the control member. The feel generator is arranged, according to the invention, to apply to the control member, a resistance to movement which:

(a) Increases, preferably linearly, or approximately so, with displacement of the control member from its neutral position, and (b) Increases with the airspeed and preferably varies approximately as the square of the airspeed.

The feel generator according to the invention comprises a first pivoted lever forming part of the pilot's control member or arranged to receive pivotal movement therefrom commensurate with the movement of the pilot's control member, a second lever mounted on a pivot parallel to that of the first lever, the two levers extending towards one another from their pivots, a coupling pin engaging in slots in the two levers and serving to impart angular movement to the second lever as the first lever moves about its pivot, spring means for offering a resistance to angular movement of the second lever in both directions from the position thereof corresponding to the neutral position of the pilot's control member, which resistance increases progressively with the displacement of the second lever from said position, and means responsive to changes in airspeed for adjusting the pin in the slots so as to increase, as the airspeed increases, the angular movement imparted to the second lever per unit angular movement of the first lever.

The feel generator according to the invention may include a pressure responsive member exposed to dynamic air pressure and arranged to effect, preferably through the agency of a servo mechanism, adjustment of the pin in the slots in accordance with changes in airspeed.

One form of feel generator according to the invention will now be described in detail, by way of example, with reference to the accompanying drawings, in which—

Fig. 1 is a side elevation of the feel generator,
Fig. 2 is a section on the line II—II in Fig. 1,
Fig. 3 is a section on the line III—III in Fig. 2,
Fig. 4 is a diagram showing the connections between the feel generator and the pilot's control member, Fig. 5 is a perspective view of an aircraft showing how an aileron is actuated by the pilot's control member.

Referring first of all to Fig. 4, 10 represents the feel generator, which is operated from the pilot's control member, in this case a wheel 11, through the agency of chain drives 12, 13 which effect rotation of a sprocket 14, in a direction and to an extent corresponding to the direction and extent of the movement of the pilot's control member. Movement of the pilot's control member is also effective, through chain drives 15, to effect adjustment of a pair of electrical transmitters 16. These, as fully explained in U. S. application Serial No. 788,869 serve to effect adjustment of remotely located electrical receivers 116 (Fig. 5) which, in turn, actuate duplicated power units 117 to drive, through a differential gear 118, a pair of torque shafts for imparting movement, through screw jacks 121 to the ailerons 120 on opposite wings of the aircraft.

Turning now to Figs. 1–3, it will be seen that the sprocket 14 is fixed to a shaft 17 (Fig. 2) supported by bearings 18, 19 in fixed brackets 20, 30. Fixed to and laterally extending from the shaft 17 is a forked lever 21, constituting a first pivoted lever. A second pivoted lever, 22, which is likewise forked, is fixed at its upper end to an inner torque tube 24 extending parallel to the shaft 17. At its right hand end, as seen in Fig. 2, the tube 24 is fixed, by rivets 26, to an outer torque tube 25, which, in turn, is secured at its left hand end to the bracket 30 by bolts 27. The two torque tubes 24, 25 serve to impose progressively increasing resistance to movement in either direction of the second lever 22 from a neutral position, shown in full lines in Fig. 1, corresponding to the neutral position of the pilot's control member. It will be noted that in this neutral position, the levers 21, 22 are in alignment.

A coupling pin 28 extends through slots 29, 31 in the levers 21, 22 respectively, and serves, as lever 21 is moved angularly by the sprocket 14, to impart angular movement in the opposite sense to lever 22 as shown in chain-dotted lines in Fig. 1. The resistance imposed by the torque tubes 24, 25 to movement of the pilot's control member clearly increases progressively and approximately linearly with the extent of movement in either direction from its neutral position. The resistance depends, however, on the position of the coupling pin 28 in relation to the slots 29, 31. When the pin is at the upper ends of the slots, as shown in Fig. 1, the angular movement imparted to lever 22 is a maximum and the resistance is a maximum. As the pin 28 is moved down in the slots, lever 22 receives a smaller angular movement per unit angular movement of lever 21 and the resistance is reduced.

The pin 28 is adjusted in position in relation to the slots in accordance with changes in air speed by the following mechanism, which ensures that the resistance to movement of the pilot's control member will vary approximately as the square of the airspeed.

The pin 28 has a threaded portion engaging a screw jack, constituted by a pair of screws 32, 33 coupled together by bevel gears 34. The screw 32 is supported in the lever 21 by bearings 35, 36, and screw 33 is supported by the bracket 30 and another bracket 37 by means of bearings 38, 39.

An electric motor 40 serves to drive the screw 33 through the agency of a worm 41 (Fig. 3) and worm wheel 42, and the screw 33 drives the screw 32, through the bevel gears 34 and so adjusts the pin 28 in the slots 29, 31. Normally the electric motor 40 is switched off.

The adjustment of the pin 28 in response to changes in airspeed is effected by means of a pressure-responsive capsule 43 mounted within, and fixed at its right hand end (Fig. 2) to, a casing 44 having an inlet 45 coupled to a Pitot head (not shown), so that the interior of casing 44 is exposed to dynamic air pressure. The left hand end of the capsule 43 is fixed to a rod 46, mounted to slide in a fixed sleeve 47 and carrying at its free end a contact 48. The contact 48 is normally disposed intermediately between a pair of spaced contacts 49, 50 carried by a nut 51 engaging the screw 33 and having an extension 52 (Fig. 3) embracing a guide rod 53 extending parallel to the screw 33 and behind it as seen in Fig. 2. The left hand end of the guide rod 53 is fixed to the bracket 30 and the right hand end of the guide rod 53 is spaced from the worm 41.

In the event of the dynamic air pressure increasing, the capsule 43 will contract, thereby causing contact 48 to make with contact 50 to complete a circuit to start the motor 40 running in the direction to move the pin 28 upwardly in relation to slots 29, 31, thereby increasing the angular movement imparted to lever 22 by lever 21 and so increasing the resistance imposed by the torsion bars 24, 25 to movement of the pilot's control member. As screw 33 is turned by the motor it will traverse nut 51 to the right, as seen in Fig. 2, until contact 50 moves away from contact 48 whereupon the motor 40 will stop.

Similarly a fall in dynamic air pressure will cause the capsule 43 to expand, causing contact 48 to make with contact 49, whereupon the motor 40 will be caused to rotate in the reverse direction to move the pin 28 downwards in relation to the slots 29, 31, thereby reducing the resistance imposed by the torque bars 24, 25 to movement of the pilot's control lever. The nut 51 will, in this case, travel to the left until contact 49 leaves contact 48, thereby stopping the motor.

Devices according to the invention may be utilized for the control members associated with the elevator, the ailerons and the rudder, being applied in the first two cases to the control column and in the last case to the rudder bar.

While, in the case illustrated, the first lever 21 is operated from the pilot's control member through the agency of a chain drive, the first lever may, in suitable cases, be constituted by an extension of the pilot's control member.

What we claim as our invention and desire to secure by Letters Patent is:

1. In a power operated flying control system for aircraft comprising a pilot's control member movable in opposite directions from a neutral position, and a control surface operable by movement of said control member, a feel generator comprising a first pivoted lever arranged to receive, on operation of the pilot's control member, pivotal movement commensurate with the movement of the pilot's control member, a second lever mounted on a pivot parallel to that of the first lever, the two levers extending towards one another from their pivots, a coupling pin engaging in slots in the two levers and serving to impart angular movement to the second lever as the first lever moves about its pivot, spring means for offering a resistance to angular movement of the second lever in both directions from the position thereof corresponding to the neutral position of the pilot's control member, which resistance increases progressively with the displacement of the second lever from said position, and means responsive to changes in airspeed for adjusting the pin in the slots so as to increase, as the airspeed increases, the angular movement imparted to the second lever per unit angular movement of the first lever.

2. In a power operated flying control system for aircraft comprising a pilot's control member movable in opposite directions from a neutral position, and a control surface operable by movement of said control member, a feel generator comprising a first pivoted lever arranged to receive, on operation of the pilot's control member, pivotal movement commensurate with the movement of the pilot's control member, a second lever mounted on a pivot parallel to that of the first lever, the two levers extending towards one another from their pivots, a coupling pin engaging in slots in the two levers and serving to impart angular movement to the second lever as the first lever moves about its pivot, spring means for offering a resistance to angular movement of the second lever in both directions from the position thereof corresponding to the neutral position of the pilot's control member, which resistance increases progressively with the displacement of the second lever from said position, a pressure responsive member exposed to dynamic air pressure and means responsive to movement of said pressure responsive member for adjusting the pin in the slots so as to increase, as the airspeed increases, the angular movement imparted to the second lever per unit angular movement of the first lever.

3. In a power operated flying control system for aircraft comprising a pilot's control member movable in opposite directions from a neutral position, and a control surface operable by movement of said control member, a feel generator comprising a first pivoted lever arranged to receive, on operation of the pilot's control member, pivotal movement commensurate with the movement of the pilot's control member, a second lever mounted on a pivot parallel to that of the first lever, the two levers extending towards one another from their pivots, a coupling pin engaging in slots in the two levers and serving to impart angular movement to the second lever as the first lever moves about its pivot, spring means for offering a resistance to angular movement of the second lever in both directions from the position thereof corresponding to the neutral position of the pilot's control member, which resistance increases progressively with the displacement of the second lever from said position, a pressure responsive member exposed to dynamic air pressure, a screw jack operable in response to movement of said pressure responsive member to adjust the pin in the slots so as to increase, as the airspeed increases, the angular movement imparted to the second lever per unit angular movement of the first lever, and a servo mechanism controlled by the pressure responsive member for actuating the screw jack.

4. In a power operated flying control system for aircraft comprising a pilot's control member movable in opposite directions from a neutral position, and a control surface operable by movement of said control member, a feel generator comprising a first pivoted lever arranged to receive, on operation of the pilot's control member, pivotal movement commensurate with the movement of the pilot's control member, a second lever ounted on a pivot parallel to that of the first lever, the two levers extending towards one another from their pivots, a coupling pin engaging in slots in the two levers and serving to impart angular movement to the second lever as the first lever moves about its pivot, spring means for offering a resistance to angular movement of the second lever in both directions from the position thereof corresponding to the neutral position of the pilot's control member, which resistance increases progressively with the displacement of the second lever from said position, a pressure responsive member exposed to dynamic air pressure, a screw jack, controlled by the pressure responsive member, for moving said pin in relation to said slots in accordance with variations in airspeed so as to increase, as the airspeed increases, the angular movement imparted to the second lever per unit angular movement of the first lever, an electric motor for driving the screw jack, a pair of spaced motor contacts, an intermediate contact disposed between said motor contacts and movable by the pressure responsive member, on change in airspeed, into contact with one or other of the motor contacts to start the motor in forward or reverse, to effect appropriate movement of the screw jack, and a follow-up gear for moving the motor contacts relatively to the intermediate contact so as to stop the motor when the pin has received a movement corresponding to that of the pressure responsive member.

5. A feel generator as claimed in claim 4, in which the motor contacts are carried by a nut engaging the screw jack and held against rotation in relation to the screw jack.

6. In a power operated flying control system for aircraft comprising a pilot's control member movable in opposite directions from a neutral position, and a control surface operable by movement of said control member, a feel generator comprising a first pivoted lever arranged to receive, on operation of the pilot's control member, pivotal movement commensurate with the movement of the pilot's control member, a second lever mounted on a pivot parallel to that of the first lever, the two levers extending towards one another from their pivots, a coupling pin engaging in slots in the two levers and serving to impart angular movement to the second lever as the first lever moves about its pivot, a fixed member, a torque tube connecting said second lever to the fixed member and imposing on the second lever resistance to pivotal movement thereof which increases with the amplitude of movement of said second lever in either direction from the position thereof corresponding to the neutral position of the pilot's control member, and means responsive to changes in airspeed for adjusting the pin in the slots so as to increase, as the airspeed increases, the angular movement imparted to the second lever per unit angular movement of the first lever.

7. A feel generator as claimed in claim 1, comprising a sprocket wheel on said first lever and a chain drive connecting the pilot's control member and said sprocket and serving to impart pivotal movement to said first lever on operation of the pilot's control member.

HENRY KNOWLER.
PETER HENRY KNOWLER.

REFERENCES CITED

The following references are of record in the file of this patent:

UNITED STATES PATENTS

| Number | Name | Date |
| --- | --- | --- |
| 2,205,610 | Van Nes | June 25, 1940 |
| 2,445,343 | Tyra | July 20, 1948 |

FOREIGN PATENTS

| Number | Country | Date |
| --- | --- | --- |
| 569,290 | Great Britain | May 16, 1945 |